Patented Apr. 20, 1937

2,078,205

UNITED STATES PATENT OFFICE 2,078,205

ALKYL CATECHOL KETONES

Ellis Miller, Philadelphia, and Walter H. Hartung, Lansdowne, Pa., assignors to Sharp & Dohme, Incorporated, Philadelphia, Pa., a corporation of Maryland No Drawing. Original application June 15, 1935, Serial No. 26,776. Divided and this application November 19, 1935, Serial No. 50,544

9 Claims. (Cl. 260—131)

This invention relates to alkyl catechol ketones. It includes the preparation of catechol alkyl ketones from guaiacol esters and from guaiacol and fatty acids and the preparation of alkyl catechol ketones by the rearrangement of catechol esters. It also includes catechol hexyl ketone and catechol heptyl ketone, which are new products.

This application is a division of our copending application, Serial No. 26,776, filed June 15, 1935. The ketones produced in accordance with this invention are valuable as intermediates for the preparation of higher alkyl catechols, which have valuable pharmaceutical properties. These higher alkyl catechols are described and claimed in our said prior application.

Alkyl catechol ketones may be advantageously prepared by the demethylation and rearrangement of guaiacol esters, or by rearrangement of individual alkyl catechol esters, or by the rearrangement of mixed mono- and/or di-esters of catechol, or by the rearrangement of mixtures of catechol and catechol di-esters.

The production of alkyl catechol ketones from guaiacol esters or catechol esters is advantageously affected in the presence of aluminum chloride. Although various inert organic solvents may be employed, carbon bisulfide is the solvent which has been found advantageous, and which we recommend. In carrying out the reaction, the temperatures must be kept comparatively low, and after removal of the solvent, the reaction mixture should preferably not be heated above 150° C., and preferably is heated around 130° and over a fairly long period of time. The process may be illustrated by the following examples; the parts being by weight.

Example 1.—Into a vessel provided with a stirrer and charging funnel and a reflux condenser, to the upper end of which an absorption apparatus for hydrogen chloride is attached, is placed a suspension of 70 parts of aluminum chloride in 195 parts by weight of carbon bisulfide. The suspension is stirred, and there is gradually added a solution of 45 parts of guaiacol propionate; 9.35 parts by weight of phosphorus oxychloride may be added simultaneously, but this is not necessary.

The reaction vessel is then heated gradually in an oil bath until its temperature reaches 90 to 95°. After refluxing and stirring for a short time, e. g. about ten minutes, the reflux condenser is replaced by a downward distilling condenser and the carbon bisulfide removed by distillation and is condensed. The temperature of the oil bath is then gradually elevated to 140° and maintained at this point for, e. g., about two hours.

The reaction mixture is now decomposed by the slow addition of dilute hydrochloric acid (1:1), and after the addition of the hydrochloric acid, heated for a short time, e. g. about 15 minutes, with the oil bath at about 130° C. The reaction products are then withdrawn, allowed to cool, and advantageously placed in a refrigerator overnight. The organic layer which separates is then removed, taken up in 160 parts of hot benzene, and the solution filtered and chilled, whereupon crystals of the ketone settle out. The time required will vary with the amount of material being treated. The crystals obtained are of good quality and on recrystallization from water give a product of maximum melting point.

By substituting guaiacol esters of other acids for the propionate, it is possible to obtain other corresponding catechol ketones. The guaiacol esters may be prepared after the customary manner for ester prepartion by allowing the guaiacol to react with an acid chloride, an acid anhydride, or the acid itself in the presence of thionyl chloride.

The following illustrate some of the esters that can be used in the production of catechol alkyl ketones:

| | Boiling Point |
|---|---|
| Guaiacol ester of propionic acid | 125–135° C. (8 mm.) |
| Guaiacol ester of butyric acid | 135–140° C. (7–10 mm.) |
| Guaiacol ester of valeric acid | Up to 180° C. (12 mm.) |
| Guaiacol ester of caproic acid | 160° C. (8–9 mm.) |
| Guaiacol ester of heptanoic acid | 160–165° C. (7 mm.) |

Example 2.—22 parts of catechol are placed in a reaction vessel provided with a charging funnel and a reflux condenser to which an absorption apparatus for hydrogen chloride is attached. The catechol is heated to melting and 37 parts of propionyl chloride are then added slowly through the funnel. Gentle heating is continued until the evolution of hydrogen chloride has ceased, leaving a mixture of mono- and di-propionyl esters of catechol.

The product is allowed to cool to room temperature, dissolved in a solvent such as carbon bisulfide if necessary, and added slowly to a stirred suspension of 70 parts of anhydrous aluminum chloride in 195 parts of carbon bisulfide contained in a reaction vessel provided with stirrer, charging funnel and reflux condenser to which a hydrogen chloride absorption apparatus is attached. When the hydrogen chloride evolution has practically ceased, the reaction vessel is heated by an oil bath until the carbon bisulfide refluxes vigorously. The reflux condenser is then replaced by a downward distilling condenser, and the carbon bisulfide removed. After this, the temperature of the oil bath is raised rapidly to 135° C. and maintained at 135–140° C. for, e. g. about 5½ hours. The solid reaction product is then allowed to cool and is decomposed by the addition of dilute hydrochloric acid (1:1). A black oil is obtained which solidifies on cooling to a crystalline mass. This mass, on recrystallization, proves to be substantially pure propionyl catechol.

Instead of adding the catechol esters to a suspension of aluminum chloride in carbon bisulfide, the esters may be dissolved in carbon bisulfide, and the aluminum chloride added to this solution, advantageously in suspension in carbon bisulfide.

*Example 3.*—27.5 parts of catechol are placed in a reaction vessel equipped with charging funnel, a stirrer, and an absorption apparatus for hydrogen chloride, and warmed on an oil bath to about 120° C. 67.2 parts of caproyl chloride are then slowly added, e. g. over a period of about 40 minutes, with constant stirring. The temperature is maintained at about 120° C. until the evolution of hydrogen chloride ceases, e. g. about 20 minutes, when 27.5 additional parts of catechol are added. The product, consisting substantially of equi-molecular amounts of catechol and catechol di-caproate, is transferred to a charging funnel and slowly added, e. g. over a period of 30 minutes, to an agitated suspension of 200 parts of anhydrous aluminum chloride in 500 parts of carbon bisulfide, in a reaction vessel equipped with a stirrer, a charging funnel, and a hydrogen chloride absorption apparatus. The mixture is then heated on an oil bath for about an hour at 65–70° C. and the carbon bisulfide is then distilled off. The temperature is then raised to about 110° C. and held there for a considerable period, e. g. four hours. The reaction mixture is then allowed to cool, and is decomposed by the cautious addition of about 500 parts of dilute (1:1) hydrochloric acid. The mixture is transferred to another vessel and allowed to cool, whereupon the supernatant layer of dark organic material crystallizes. The crystals are crude caproyl catechol, which may be purified by distillation in vacuo, or by recrystallization from benzene, or by a combination of the two procedures.

By substituting for guaiacol propionate in Example 1 the appropriate guaiacol ester, or for the propionyl chloride of Example 2 or the caproyl chloride of Example 3 the appropriate acid chloride, and using the same molecular ratios as are used in these examples, other catechol alkyl ketones may be prepared, of which the following are typical:

| | Melting point |
|---|---|
| Catechol propyl ketone | 139° C. |
| Catechol butyl ketone | 97° C. |
| Catechol isobutyl ketone | 106–107° C. |
| Catechol amyl ketone | 93.8° C. |
| Catechol isoamyl ketone | 73.0–73.5° C. |
| Catechol hexyl ketone | 78–79° C. |
| Catechol heptyl ketone | 95.5–96.0° C. |

We claim:
1. As a new product, catechol hexyl ketone.
2. As a new product, catechol heptyl ketone.
3. The method of simultaneously demethylating and rearranging a guaiacol ester to form a catechol alkyl ketone which comprises heating the guaiacol ester with aluminum chloride in solution in an inert solvent, distilling the solvent and then heating to a temperature preferably less than 150° C.
4. The method of converting guaiacol esters to catechol alkyl ketones which comprises heating the ester with aluminum chloride in carbon bisulfide, then removing the carbon bisulfide by distillation and then further heating.
5. The method of converting guaiacol esters to catechol alkyl ketones which comprises heating the ester with aluminum chloride in carbon bisulfide.
6. The method of converting guaiacol esters to catechol alkyl ketones which comprises heating a guaiacol ester with aluminum chloride in an inert solvent at a comparatively low temperature during the initial stages, then removing the solvent and heating to a temperature not above 150° over a fairly long period of time.
7. The method of preparing catechol alkyl ketones which comprises melting catechol and adding an acyl chloride, adding the reaction product to a suspension of anhydrous aluminum chloride in carbon bisulfide, refluxing vigorously, distilling off the solvent and then heating at a temperature approaching but under 150° C., cooling, and decomposing by the addition of dilute hydrochloric acid.
8. The method of preparing catechol alkyl ketones which comprises preparing a mixture of a di-ester of catechol and catechol, adding the mixture to a suspension of anhydrous aluminum chloride in carbon bisulfide, refluxing vigorously, distilling off the solvent, and heating at a temperature approaching but preferably under 150° C., cooling, and decomposing by the addition of dilute hydrochloric acid.
9. The method of preparing catechol alkyl ketones which comprises heating a compound of the class consisting of guaiacol esters and catechol esters with aluminum chloride in carbon bisulfide.

ELLIS MILLER.
WALTER H. HARTUNG.